US010348233B2

(12) United States Patent
Hellström

(10) Patent No.: US 10,348,233 B2
(45) Date of Patent: Jul. 9, 2019

(54) DC BUS RIPPLE REDUCTION

(71) Applicant: AROS ELECTRONICS AB, Mölndal (SE)

(72) Inventor: Jerker Hellström, Mölndal (SE)

(73) Assignee: AROS ELECTRONICS AB (SE)

( * ) Notice: Subject to any disclaimer, the term of this patent is extended or adjusted under 35 U.S.C. 154(b) by 0 days.

(21) Appl. No.: 15/576,499

(22) PCT Filed: May 25, 2016

(86) PCT No.: PCT/EP2016/061789
§ 371 (c)(1),
(2) Date: Nov. 22, 2017

(87) PCT Pub. No.: WO2016/193092
PCT Pub. Date: Dec. 8, 2016

(65) Prior Publication Data
US 2018/0175770 A1   Jun. 21, 2018

(30) Foreign Application Priority Data

Jun. 1, 2015 (EP) .................................... 15170124

(51) Int. Cl.
*H02M 3/335* (2006.01)
*H02P 27/06* (2006.01)
(Continued)

(52) U.S. Cl.
CPC ............. *H02P 27/06* (2013.01); *H02M 1/14* (2013.01); *H02M 7/48* (2013.01); *H02M 7/521* (2013.01);
(Continued)

(58) Field of Classification Search
CPC .. B60L 2210/40; B60L 2220/40; H02M 1/14; H02M 2007/4818; H02M 7/48; H02M 7/521; H02M 7/523; H02P 27/06
See application file for complete search history.

(56) References Cited

U.S. PATENT DOCUMENTS 6,313,602 B1    11/2001  Arefeen et al.
6,351,091 B1 *   2/2002  Heinkel .................... H02P 6/30
                                                   318/400.11
(Continued)

OTHER PUBLICATIONS

Colak I et al., High Frequency Resonant DC Link PWM Inverter, 7th Mediterranean Electrotechnical Conference; Proceedings; Apr. 12-14, 1994, Hotel Dedeman, Antalya, Turkey, IEEE Service Center, Piscataway, NJ, Apr. 12, 1994, pp. 1251-1254, XP010130672, DOI: 10.1109/MELCON.1994.380839.
(Continued)

*Primary Examiner* — Muhammad S Islam
(74) *Attorney, Agent, or Firm* — Tarolli, Sundheim, Covell & Tummino LLP

(57) ABSTRACT

An electrical motor system and a method for operating the electrical motor system are disclosed. The electrical motor system comprises a direct current (DC) source, a filter connected in parallel with the DC source and an electric motor with at least two sets of windings. A voltage signal is provided from the DC source to the inverter circuit where the signal is modulated. The modulated signal is then supplied from the inverter circuit to each set of windings with a respective time offset between each set of windings respectively, providing a very efficient DC bus ripple reduction. Hereby, it is e.g. possible to use small filter capacitors/capacitor banks in electrical motor systems.

11 Claims, 4 Drawing Sheets

(51) Int. Cl.
*H02M 7/48* (2007.01)
*H02M 1/14* (2006.01)
*H02M 7/521* (2006.01)
*H02M 7/523* (2006.01)

(52) U.S. Cl.
CPC ......... *H02M 7/523* (2013.01); *B60L 2210/40* (2013.01); *B60L 2220/40* (2013.01); *H02M 2007/4818* (2013.01)

(56) References Cited

U.S. PATENT DOCUMENTS

| | | | |
|---|---|---|---|
| 8,115,433 B2 | 2/2012 | Welchko | |
| 8,373,372 B2 | 2/2013 | Su | |
| 8,648,559 B2 | 2/2014 | Singh | |
| 2008/0298785 A1* | 12/2008 | Patel | H02M 1/14 388/820 |
| 2009/0034308 A1* | 2/2009 | Welchko | B60L 11/1868 363/133 |
| 2010/0328977 A1 | 12/2010 | Asplund | |
| 2011/0074326 A1 | 3/2011 | Su | |

OTHER PUBLICATIONS

International Search Report and Written Opinion for corresponding International Application No. PCT/EP2016/061789, dated Oct. 21, 2016.

Office Action corresponding to European Application No. 15170124.0 dated Nov. 26, 2018.

\* cited by examiner

DC BUS RIPPLE REDUCTION

RELATED APPLICATIONS

The present invention is a U.S. National Stage under 35 USC 371 patent application, claiming priority to Serial No. PCT/EP2016/061789, filed on 25 May 2016; which claims priority of EP 15170124.0, filed on 1 Jun. 2015, the entirety of both of which are incorporated herein by reference.

TECHNICAL FIELD OF THE INVENTION

The present invention relates to electric motors, and more specifically to electric motor control.

BACKGROUND

In recent years more and more resources are used towards providing environmentally friendly solutions in many fields of technology, in particular automobile technology. Electric vehicles, such as e.g. hybrid electric vehicles, fuel cell powered vehicles and battery powered vehicles, are rapidly increasing in popularity due to immense advancements being made in propulsion range, power and reliability of the vehicle, so to reach the long term goal of reducing crude oil consumption and emission of harmful pollutants and greenhouse gas in the world.

A conventional electric motor system consists of a power source, a rectifier with a filter capacitor in case of an AC-feed, or just a filter capacitor in case of a DC-feed and an inverter (motor control circuit). Pulse Width Modulation (PWM) techniques have long been used to improve performance and reliability of power conversion devices and are often used to generate alternating current to the motor in electric vehicles. PWM schemes are used to adjust the amplitude and frequency of the fundamental component of the inverter output and while doing so current is momentarily fed to the motor via the inverter circuit, however, even though that the inductance present in the winding(s) of the motor slows down the rush of current to the motor, there will still be a commutation of inductive current in the motor to momentary current from the feeding circuit, which will result in large ripple AC components over the DC bus.

The conventional way to handle the, often harmful, voltage ripple over the DC bus has been to introduce very large capacitors configured to absorb the DC bus ripple. However, currently available capacitors with the required capacitance are associated with many problems such as cost, size and reliability. Often electrolytic capacitors must be used which increase weight/size of the system, severely reduce the overall life-time of the system and also exhibit poor performance under the ambient conditions present in automotive applications resulting in a need for complex and often expensive adaptations of the whole system.

There is therefore a need for an improved method and system for electric motor control, in particular in automotive applications, to meet the cost, size and lifetime requirements for electric vehicles. Even though the above discussion is focused on electric vehicles, similar situations and problems are encountered in many other types of rotary electric machine applications.

SUMMARY OF THE INVENTION

It is accordingly an object of the present invention to provide an electrical motor system and a method for operating an electrical motor system which alleviates all or at least some of the above-discussed drawbacks of the presently known systems.

This object is achieved by means of an electrical motor control method and system as defined in the appended claims.

According to a first aspect of the present invention, there is provided a method for controlling an electrical motor system comprising a direct current (DC) source, a filter connected in parallel with the DC source and an electric motor with at least two sets of windings, said method comprising the steps of:

providing a voltage signal from the DC source to an inverter circuit via conductors, said conductors having an inductance;

modulating said voltage signal in the inverter circuit;

supplying a time shifted modulated signal, to each of said at least two sets of winding with a time offset between each set of windings respectively, wherein said time offset is based on the period of a resonance frequency, said resonance frequency being dependent on a filter capacitance and the conductor inductance.

The "DC source" may comprise any device providing a direct current without a need for a rectifying device, such as e.g. batteries, fuel cells, fuel cell stacks, solar cells, an ultra cell capacitor or any other equivalent solution useable as a voltage source. However, the DC source may also comprise an alternating current (AC) source and a rectifier circuit. The rectifier circuit may be a half-wave rectifier, but preferably a full-wave rectifier and the circuit may be arranged in various ways as known in the art using semiconductor devices such as e.g. junction diodes, Schottky diodes, thyristors, etc. Moreover, the rectifier circuit may be single-phase or multi-phase depending on the intended application. In an exemplary embodiment the rectifier circuit may be a synchronous rectifier comprising active components such as e.g. transistors. By using a synchronous rectifier a path back towards the voltage source may be opened for the current, so to e.g. open up for regenerative braking systems.

The filter is preferably connected in parallel with the DC source, for example either directly over the battery and inverter circuit. Alternatively, the filter may be coupled over a rectifier circuit if an underlying AC source is used. The filter may be any type of capacitor, often called a DC bus capacitor, and it is generally required for filtering or absorbing the often harmful voltage ripple on a DC bus voltage line. The filter may be a single filter capacitor; however any filter capacitor circuit which provides the functionality of a single filter capacitor may be used.

The electrical motor may be any applicable electrical motor comprising at least two sets of windings, such as e.g. AC induction motors, Brushless DC motors (BLDC), Permanent Magnet Synchronous Motors (PMSM), etc. It is to be understood that a set of windings includes at least one winding or coil. For example, a single phase AC motor according to an exemplary embodiment of the invention comprises two separated windings/coils placed on opposite sides of a rotor (180° apart), it can then be said that such a motor has two sets of windings wherein each set comprises one winding/coil. However, according to another exemplary embodiment a single phase AC motor comprises a first set of windings which has two windings/coils in series, the two coils being wound on slots located 180° apart, and a second set of windings occupying (or sharing) the same slots. A motor according to the latter embodiment can then be said to comprise two sets of windings, wherein each set comprises two windings/coils.

Even though the above-discussed terminology is in reference to single phase AC motors, it is equally applicable to multi phase AC motors where a set of windings would include all phases and their respective windings, e.g. a three phase AC motor may comprise two sets of windings, wherein each set includes three separate windings, one for each phase. The at least two sets of windings in the multi phase AC motor may occupy the same slots or they may be spatially separated.

Moreover, the electrical motor may be a single phase or multi-phase AC motor. In an exemplary embodiment, the electrical motor is a single phase AC motor, comprising at least two sets windings, wherein the at least two sets of windings are electrically isolated from each other.

In another exemplary embodiment the electrical motor is a multi-phase AC motor, such as e.g. a two-phase AC motor, where the motor comprises at least two sets of windings, each set of windings preferably being electrically (galvanically) isolated from the other. The multi-phase motor may be arranged so to have a winding/coil connected in series with a winding/coil located on the opposite side of the rotor (180° apart), for every phase, forming a pole pair for every phase. All phase windings combined then form a set of windings (two phase windings for a two-phase motor, three phase windings for a three-phase motor, etc.). Accordingly, a second set of windings are arranged to occupy the same slots as the first set of windings according to the exemplary embodiment. However, the windings/coils may also be separated, i.e. not connected in series, and in that case the windings that are fed with the same AC signal (which may have multiple phases) will fall under the term a group of phase windings. Moreover, in a multi phase motor each phase winding within the same set of windings may be connected at one end at a common and/or neutral node.

Further, the sets of windings can have a multi-phase configuration for multi-phase AC motors, such as e.g. a three-phase configuration in case of a three-phase AC motor. The at least two sets of windings may have identical windings structures, i.e. having a first set having the same winding factor as a second set. The at least two sets of windings may further occupy the same stator slots but being galvanically isolated from each other, i.e. a phase A winding on a first set of windings may share the same stator slot as a phase A winding on a second set of windings.

Continuingly, the voltage signal provided to the inverter circuit is modulated in the inverter circuit. Preferably the modulation may be controlled by a controller. The inverter circuit may be configured to provide a modulated signal for controlling an AC-motor, but it may alternatively be configured to provide a modulated voltage signal suited for controlling a BLDC-motor. Any known method for supplying a modulated signal may be used; preferably the electrical motor is controlled with pulse width modulation (PWM) which is widely known in the art. For the sake of brevity, conventional techniques related to signaling, current sensing, motor control and other functional aspects of the system are not described in detail, however, one having ordinary skill in the relevant art will readily recognize that the invention can be practiced without one or more of the specific details.

The present invention is based upon the realization that by allowing the current to flow through at least two sets of windings in an electrical motor, with a time offset between each current (each set of windings), and where the time offset is based on the period of the system's resonance frequency, many advantages can be achieved, such as e.g. reduction of voltage variation across the feed, diminishing of large voltage variations associated with the switches in the inverter circuit operating at a switch frequency close to the resonance frequency, the feed current's RMS value can be reduced, reduction of electromagnetic interference from cabling, etc. The inventors realized that the inductance present in the conductors/wires used in the system will give rise to a resonant circuit in combination with the filter capacitor and considered the high ripple voltages associated with operation of the switches at a switching frequency close to the resonance frequency.

Moreover, since the conventional electrical motor would have one set of windings where there according to the invention are at least two sets, the current through each winding may be reduced without losing performance, this reduction in current will not have any impact on the voltage ripple, but instead losses may be reduced and the life-span of the system may be increased as the switches in the inverter are subjected to smaller currents (current magnitudes).

A practical advantage is that filter capacitors with lower capacitance values can be used, thus, electrolytic capacitors can be avoided to a larger extent, and by avoiding electrolytic capacitors the overall life span of the complete system may be increased, along with its robustness. It is common practice with capacitors with capacitances above a certain value to use charging circuits to handle the large inrush current/input surge current; the charging circuit often comprises several components such as e.g. fuses, reverse polarity protective circuits, etc. Thus, by avoiding large capacitance values simpler and more cost-efficient systems may be used. However, some high power application will require use of electrolytic capacitors anyway, but a system according to the inventive concept will still reduce the ripple voltage enough to lower the capacitance requirements and accordingly reduce the size of the capacitor banks, and consequently reduce the size of the whole system.

Furthermore, in automotive applications, there are standardized tests for simulating a residual AC on the DC supply (ISO 16750-2:2006(E), 4.4), which would destroy electrolytic capacitors unless specific protective circuits and/or components are used. Hence, the present invention also provides a possibility for a simpler and more cost-efficient electrical motor control system by alleviating the need for excess protective components.

In one exemplary embodiment, the resonance frequency of the system is predetermined. The resonance frequency may be calculated based on known parameters of the system, such as e.g. the capacitance of the filter capacitor and the inductance in the conductors/wires between the DC source and the inverter circuit. Thus, a simple and cost-efficient system may be achieved. However, because the length of the conductors/wires between the DC source and the inverter circuit must be known beforehand, the system is specific to the particular model or to the device in which the system is used. Accordingly, the resonance frequency is determined and set for every system that uses different conductors/wires from the DC source, i.e. removing the inverter circuit, motor and filter and installing them at some other place would not always be possible without re-adjustments.

In another exemplary embodiment, the method further comprises a step of determining the resonance frequency of the system. The determining measurement may for example be performed by sending a pulse across the feed and then deriving a frequency value from the resulting oscillating waveform. The resonance frequency may be measured upon installation of the complete system and/or the measurement can be performed at any time. This results in a very dynamic solution, in particular for a system in which some parameters may be unknown, such as e.g. the length of the conductors/wires between the inverter circuit and the DC source, making the determination of the inductance value of the conductors/wires cumbersome.

The measured or predetermined resonance frequency is used to determine the appropriate time offset. The time offset may according to one example embodiment depend on a ratio between the period of the resonance frequency and the number of sets of windings comprised by the electric motor. Resonance occurs at the frequency where the inductive impedance of the conductors/wires of the feed circuit and the capacitive impedance of the filter are equal; the resonance frequency can be derived from the following known formula:

$$f_0 = \frac{1}{2\pi\sqrt{LC}}$$

Where L is the conductor/wire inductance of the system and C is the capacitance of the filter. Accordingly, the period of the resonance frequency is given by the relation $$t_0 = \frac{1}{f_0},$$

which would result in a time offset $$t_{\mathit{off}} = \frac{t_0}{n},$$

where n is the number of sets of windings. So, for an electric motor comprising two sets of windings the offset would be half the period of the resonance frequency (180°), with three sets of windings it would be a third of the period of the resonance frequency (120°), and so on.

In one exemplary embodiment the method step of modulating said voltage signal in the inverter circuit, comprises operating a plurality of switches comprised by the inverter circuit at a switching frequency. The switching frequency is chosen based on a variety of parameters, and often depends on the electrical motor features and inductance/resistance values of the windings; many times one is forced to make a trade-off between noise reduction and losses. The resonance based time-offset discussed herein is applied to the modulated signal, i.e. in reference to the switching frequency, which may be done by applying the time offset to the (triangular/saw tooth) carrier signal or to the resulting modulated signal, e.g. if a PWM scheme is used. Hence, in one exemplary embodiment of the invention the modulation is performed using time shifted carrier signals in order to generate multiple time shifted modulated signals. Thus, a time shifted modulated signal may be supplied to each of the plurality of sets of windings.

In another exemplary embodiment the modulation is performed using one single carrier signal to generate one modulated signal, which modulated signal is time shifted to generate multiple time shifted modulated signals. Also here, a time shifted modulated signal may be supplied to each of the plurality of sets of windings.

The concept of shifting the modulated signal supplied to each set of windings with a time offset or phase offset is known in the art, examples can be found in various documents such as e.g. in U.S. Pat. Nos. 8,373,372, 8,115,433 and 8,648,559, all of which are hereby incorporated by reference. The phase shift introduced in the aforementioned documents is based on the switching frequency (carrier frequency), and it is mainly efficient when operating the switches at a frequency relatively close to the resonance frequency, which may not always be a practical solution and in fact often avoided. However, in the aforementioned documents there is no reference at all to a resonance frequency, and particularly not in relation to a time/phase offset.

By enforcing a time offset which is based on the resonance frequency of the system the voltage ripple reduction is efficient over a wide switching frequency span which results in efficient voltage ripple reduction over the DC source even for switching frequencies that aren't close to the system's resonance frequency. Consequently, the present invention allows the system to be designed so that it has a higher resonance frequency, which can be done by choosing smaller filter capacitance values, which directly results in smaller filter capacitors but without requiring the switches in the inverter circuit to operate at a higher switching frequency and thus avoiding the associated losses and other problems with high frequency signal modulation. It is common practice in the art of electrical motor control to configure the inverter to operate at a switching frequency which is lower than the resonance frequency due to efficiency requirements, which means that known techniques of ripple reduction as in the aforementioned documents would not be efficient in such systems. Accordingly, the present invention provides a higher degree of freedom, and potential reduction of losses due to the ability to lower DC bus ripple even at lower switching frequencies. Thus, according to one exemplary embodiment of the invention the switching frequency is different than the resonance frequency. The switching frequency may be lower or higher than the resonance frequency.

According to another aspect of the present invention, there is provided an electrical motor system comprising:
 a DC source;
 an electric motor comprising at least two sets of windings;
 a filter connected by conductors in parallel with the DC source, said conductors having an inductance;
 an inverter circuit connected between the filter and the electric motor, said inverter circuit comprising a plurality of switches;
 a controller configured for generating control signals for the plurality of switches so to supply a modulated signal to each set of windings, wherein each modulated signal is shifted with a time offset between each set of windings respectively, wherein said time offset is dependent on the period of a resonance frequency of the system, said resonance frequency being dependent on a filter capacitance and the conductor inductance.

With this aspect of the invention, similar advantages and preferred features are present as in the previously discussed first aspect of the invention.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

FIGS. 1 a, b and c illustrate three stator winding models for an exemplary single phase AC motor 1, the figures serve mainly to aid the understanding of the inventive method and system.

Figure 1A:
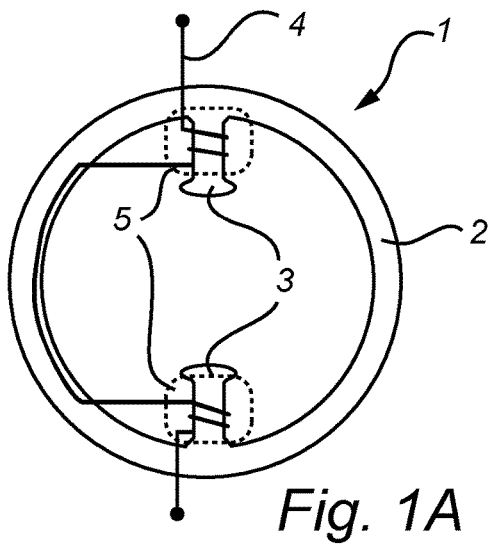
FIG. 1a illustrates a winding structure of a conventional single phase electrical motor.

In a conventional single phase AC motor 1, FIG. 1a, the two windings 5 are connected in series and they are supplied with the same modulated signal, therefore they are in general represented by a single set of windings 4 i.e. two windings 5 in series wound on slots 3 located on opposite sides of a rotor (not illustrated), 180° apart, providing an alternating magnetic field across the rotor, as known in the art. This is a well known general model of a single phase AC motor, and many details regarding the functionality, operation, control, etc are omitted because these details would be obvious for the person skilled in the art. Moreover any "start-windings" as used to initiate a rotation of the rotor as in conventional single phase AC motors are not illustrated in the figures, but they may however be used in various embodiments of the invention as would be obvious for one skilled in the art.

Figure 1B:
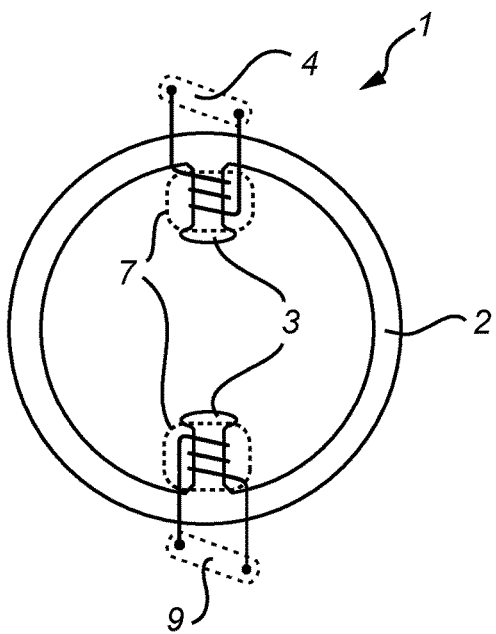
FIG. 1b illustrates a winding structure of a single phase electrical motor in accordance with an embodiment of the present invention.

FIG. 1b shows an exemplary winding structure for a single phase AC motor 1, where the series windings 5 of FIG. 1a, are separated into two separate windings 7 which are galvanically isolated from each other, thus defining two sets of windings, each set comprising one winding (or coil) 7. Each set of windings (each winding/coil 7 in this example) is then supplied with essentially the same modulated signal, so to create an alternating magnetic field as in FIG. 1a, but with a time offset introduced between the two modulated signals (in accordance with the invention) so to achieve a reduction of the voltage ripple across the DC feed, where the time offset is based on a period of the resonance frequency of the system.

Figure 1C:
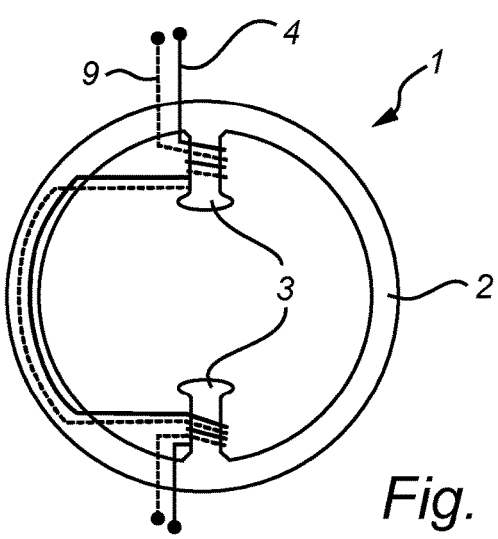
FIG. 1c illustrates a winding structure of a single phase electrical motor in accordance with an embodiment of the present invention.

However, in FIG. 1c another exemplary winding structure is presented, where a second set of windings 9 is introduced and wound around the same slots 3 as the first set of windings 4 (the first set of windings 4 is essentially the winding illustrated in FIG. 1a), the two sets of windings being galvanically isolated from each other. Each set of windings 4, 9 is then supplied with essentially the same modulated signal but with a time offset introduced between the two modulated signals so to achieve a reduction of the voltage ripple across the DC feed, in similar fashion as in the previous exemplary embodiment the time offset is based on a period of the resonance frequency of the system.

By having at least two sets of windings in the electrical motor the current through the switches can be reduced by half (in the two examples of FIG. 1b-c) and still maintain the same magnetic field strength (as in FIG. 1a) which will reduce the current magnitude flowing through the switches, and the associated losses, additionally the life span/longevity of the switches is improved. However, the reduced current has no significant effect on the voltage ripple reduction which almost completely is a result of the introduced time offset between the modulated signals.

It is to be understood that the term a set of windings could mean one winding/coil 7, as shown in FIG. 1b where there are two sets of windings 4, 9, i.e. two coils 7. Moreover, the term should also be understood as a plurality of windings connected in series to form a set of windings 4, 9 as illustrated in FIG. 1c where there are four windings or coils in total which are connected in pairs to form two sets of windings 4, 9. Also it could be a combination of the two definitions, for example in a three-phase motor there may be two or three sets of windings, each comprising a group of phase windings where the phase windings may either be according to FIG. 2b or 2c or a combination of the two. The skilled person understands that there are several alternative ways in which the windings or coils in the electric motor can be arranged, and that the invention is readily applicable to any one of those alternative ways as long as there are at least two sets of windings present. Also, even if almost all references are made towards a single phase electrical motor, the subject matter described herein is independent of the number of phases of the motor and the invention is equally applicable on a multi-phase motor, as will be briefly presented with a three phase motor in the following.

Figure 2A:
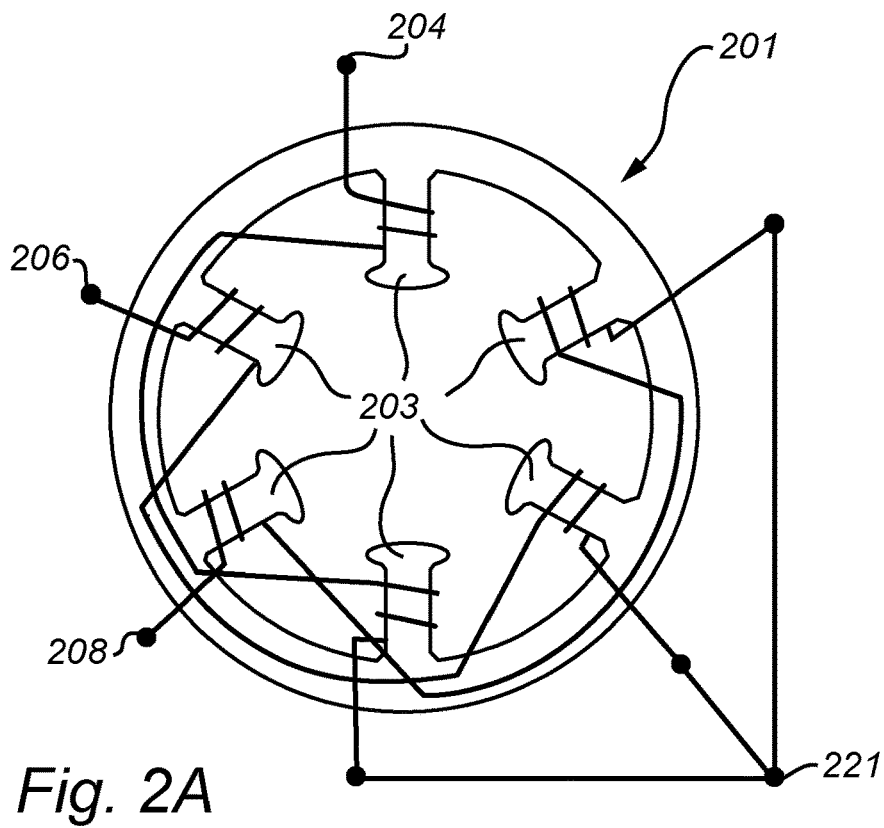
FIG. 2a illustrates a winding structure of a conventional three phase electrical motor.
Figure 2B:
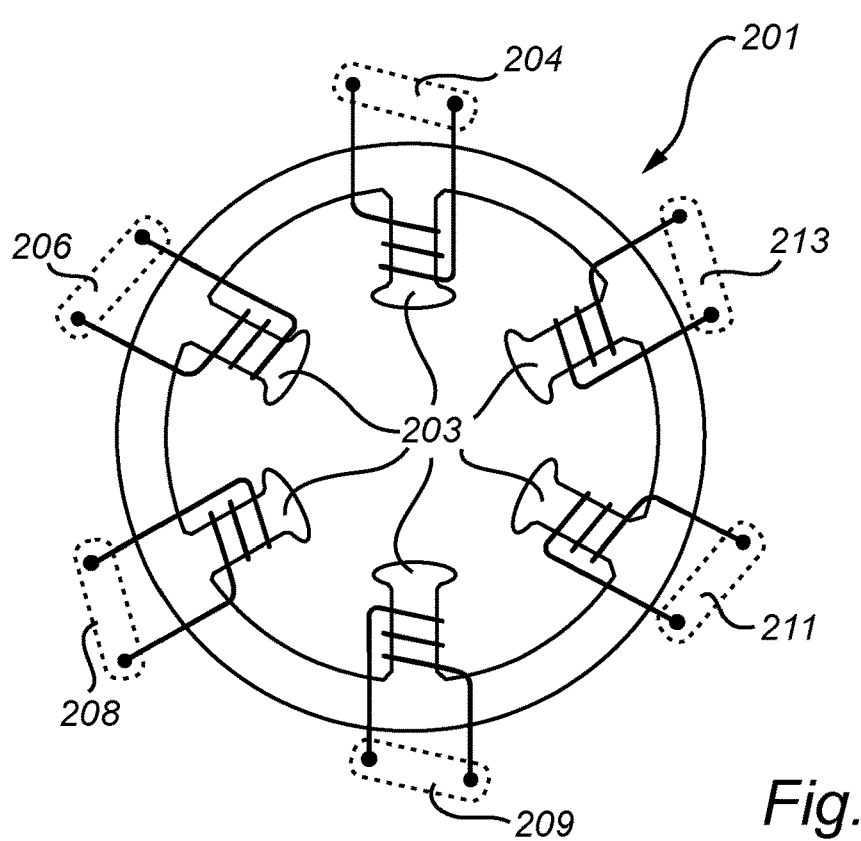
FIG. 2b illustrates a winding structure of a three phase electrical motor in accordance with an embodiment of the present invention.
Figure 2C:
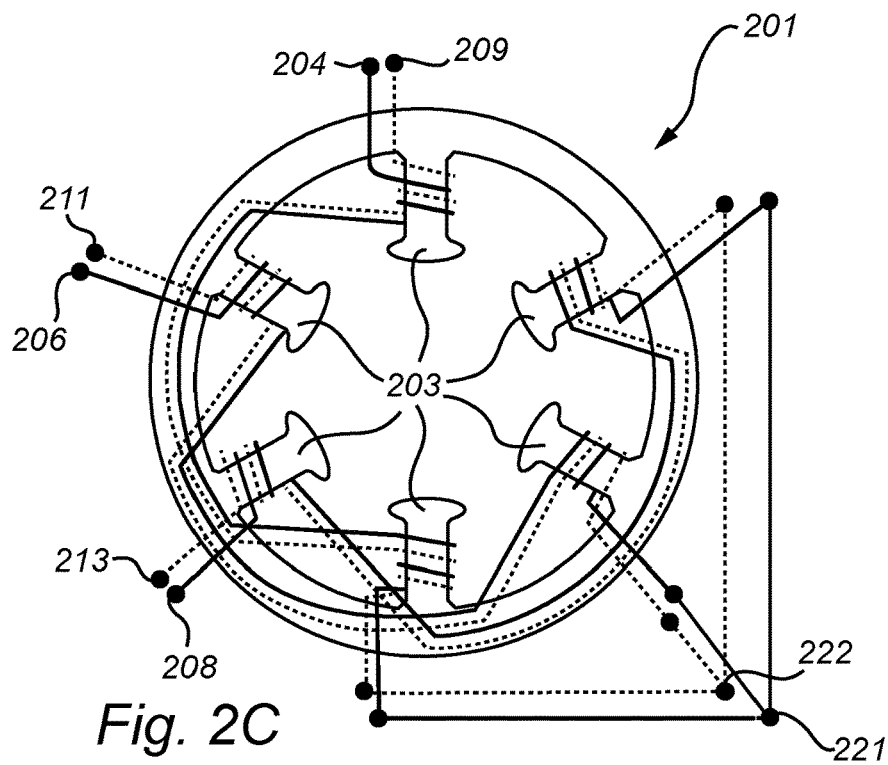
FIG. 2c illustrates a winding structure of a three phase electrical motor in accordance with an embodiment of the present invention.

FIGS. 2a, b and c illustrate the corresponding winding structures of a three phase electric motor as the ones described in FIGS. 1a, b and c for the single phase motor. FIG. 2a illustrates a conventional winding structure for a three phase electric motor having a stator 201 with three pole pairs (opposing slots 203 in the stator 201) and a group of phase windings 204, 206, 208, thus, the motor can be said to have a single set of windings. As in the corresponding illustrations for the single phase electrical motor no rotor is illustrated in FIGS. 2a-c. Further, each phase winding 204, 206, 208 may each have one end connected to a common node 221 which may be terminated, i.e. the winding structure may be arranged in a so called Y-configuration (or wye-configuration).

FIG. 2b illustrates an exemplary winding structure in accordance with the invention where the series windings for each pole pair are separated so to form two sets of windings, each set comprising a group of phase windings 204, 206, 208, 209, 211, 213 (three phase windings in each group in this case) which are electrically/galvanically isolated. In this exemplary embodiment illustrated in FIG. 2b one set of windings may be 204, 206, 208 and the second set may be 209, 211, 213, where the first set 204, 206, 208 may be supplied with a modulated AC signal with AC components (120° apart); phase A, B, and C respectively. Consequently the second set of windings, 209, 211, 213 are supplied with essentially the same modulated signal but with a time offset (phase A plus offset to winding/coil 209, phase B plus offset to winding/coil 211 and so on). Also in this embodiment (FIG. 2b) it is possible to arrange a Y-configuration in each set of windings by connecting one end of each phase winding within the same set to a common node (not illustrated).

FIG. 2c illustrates an exemplary winding structure in accordance with the invention where an additional set of windings has been added to the winding structure of FIG. 2a. The figure shows a first set of windings 204, 206, 208 and a second set of windings 209, 211, 213 sharing the same slots 203 of the stator 201 but being galvanically isolated. This winding structure follows the same principle of operation as previously described for FIG. 2b and may also be arranged in a Y-configuration where each set of windings are connected at one end to a common node 221, 222. Moreover, arranging an additional set of windings in the stator 201, sharing the same slots 203 as the other sets of windings, the three sets being galvanically isolated from each other, is also within the scope of the invention, i.e. a triple winding structure. The time offset in case of three sets of windings may be adjusted accordingly. FIGS. 2a-c are used to show the basic principles of the invention and the applicability to a multi-phase electric motor, and even though the figures refer to a three-phase motor it is equally applicable to any multi-phase motor, e.g. a two-phase or a five-phase electrical motor following the same general concept of having at least two sets of windings.

Figure 3:
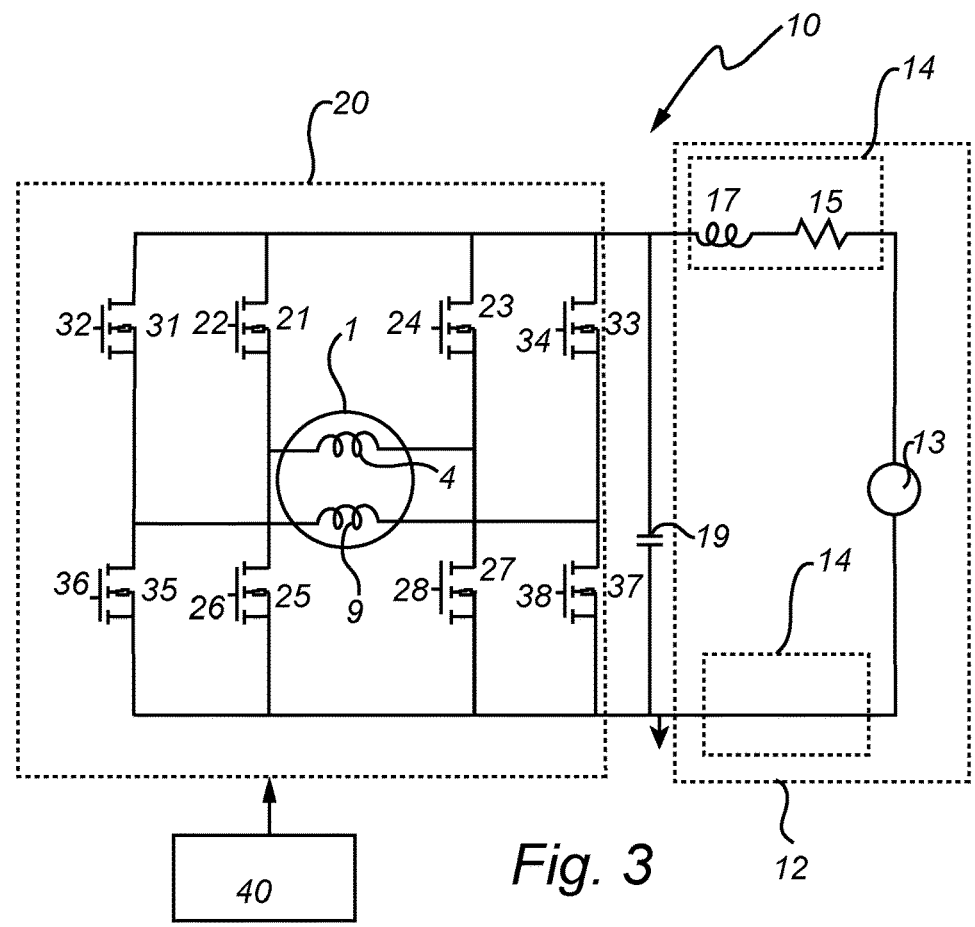
FIG. 3 is a schematic illustration of an electrical motor system with an electrical motor comprising two sets of windings in accordance with an embodiment of the present invention.

In FIG. 3, a schematic illustration of an electric motor control system 10 according to an exemplary embodiment of the invention is provided. The system comprises a DC source 13 from which a voltage signal is generated and transmitted through conductors/wires 14 to the inverter circuit 20. A general schematic model of a conductor can be approximated with a series inductance 17 and resistance 15. A filter 19 is connected in parallel between the inverter circuit 20 and DC feed circuit 12. In this exemplary embodiment the filter 19 is illustrated as a single capacitor, however, it is readily understood by one skilled in the art that any filter circuit or capacitor bank which provides the same functionality may be used in the various embodiments of the invention.

The inverter circuit 20 includes a plurality of switches 21, 23, 25, 27, 31, 33, 35, 37 where the switches are arranged in H-bridge configurations around each set of windings 4, 9 of the single phase electrical motor 1. Even though that this particular embodiment is illustrated with n-channel MOSFETs (metal oxide semiconductor field effect transistors) it is understood that this is for illustrative purposes only. Accordingly, the invention is not limited in this regard. Instead any type of switch element or circuit which provides the same functionality as the switches illustrated in the exemplary embodiment may be used. Moreover, the switches may comprise a diode connected in an anti-parallel fashion with a transistor, so to protect from any occurrences of reverse voltage at the drain to source of the transistors (not illustrated).

The employment of H-bridges for controlling electrical motors is well-known in the art, and won't be discussed in any particular detail as it will be readily appreciated by one skilled in the art how the present invention may be practiced without these specific details. Moreover, there are alternative ways to control electrical motors such as e.g. using half-bridge topologies instead of the full-bridge topology as illustrated in FIG. 3.

A controller 40, containing one or more microprocessors, is configured to operate the inverter circuit 20 to achieve a desired power flow between the DC source 13 and the motor 1 and reduce the voltage ripple, as will be described below. The controller may also be configured and used for taking measurements of motor phase currents, rotor position/speed, DC output voltage, and/or motor speed or torque commands as inputs and for carrying out a motor control algorithm to generate a set of signals (single phase or multiphase) modulation signals.

Further, the controller 40 may be configured to perform pulse width modulation by comparing the set of single-/multiphase signals with carrier signals and driving the input gates 22, 24, 26, 28, 32, 34, 36, 38 of respective switches 21, 23, 25, 27, 31, 33, 35, 37.

Moreover, the controller may be used to measure the resonance frequency of the system for example by loading the conductors 14. The resonance frequency will mainly depend on the inductance and capacitance values of the conductors 14 and filter 19 respectively. Hence, for various systems having varying spatial setups and applications, the conductors/wires 14 will be of varying length and the filters will be of varying sizes, resulting in different resonance frequencies, accordingly by measuring the resonance frequency, installation is simplified and a more dynamic solution is achieved. The resonance frequency of the system may alternatively be predetermined by calculating or approximating the resonance frequency of the feed circuit 12 by using known capacitance and inductance values for the filter 19 and conductors/wires 14 respectively. The resonance frequency may be determined by various known formulas or equations known by a skilled person in the art. Alternatively the time shift may be accomplished by connecting the appropriate passive components, as e.g. in single phase motors utilizing a start-winding/auxiliary-winding is connected to the same feed as the main winding but separated by a capacitor, e.g. a capacitor-start induction motor.

Once the resonance frequency has been determined, and consequently the corresponding period of the resonance frequency, the modulated signals to be supplied to the two sets of windings 4, 9 comprised by the electric motor 1 are time shifted relative to each other with a time offset. The time offset being based on the period of the resonance frequency. The time offset may preferably depend on a ratio between the period of the resonance frequency and the number of sets of windings comprised by the electric motor. Also, even if almost all references are made towards a single phase electrical motor, the subject matter described herein is independent of the number of phases of the motor and the invention is equally applicable on a multi-phase motor.

Figure 4:
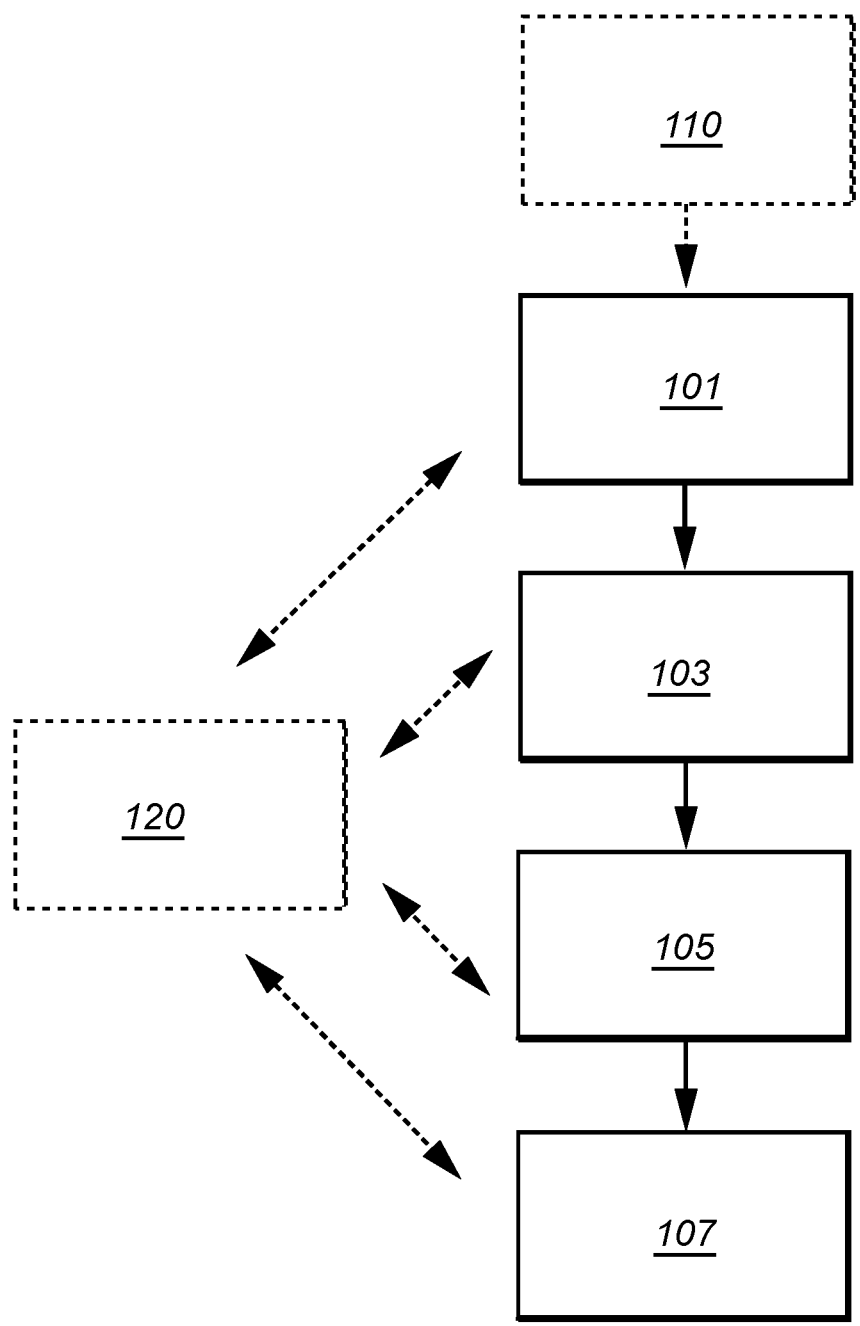
FIG. 4 is a flow chart illustrating a method according to an embodiment of the present invention.

FIG. 4 is a flow chart illustrating a method according to one exemplary embodiment of the invention. Assuming a system according to any exemplary embodiment of the invention, such as e.g. the one illustrated in FIG. 3, a resonance frequency of the system may be predetermined 110, as described in previous passages. In an alternative exemplary embodiment the resonance frequency is measured 120. As indicated by the arrows in FIG. 4 the measurement may be performed at any time. However, preferably a resonance frequency is measured before the signal is modulated 103. A voltage signal is provided 101 from the DC source to the inverter circuit via some conductors or wires, where the conductors will typically have some inductance which may be known before the system is installed. A filter coupled in parallel between the inverter circuit and the feed circuit, intended for minimizing of AC components which might be present in the DC signal, but also for handling the voltage ripple resulting from operation of the motor. In a further step the provided voltage signal is modulated 103 in the inverter circuit, typically the modulation will be controlled by an external or integrated controller (or control circuit). The signal is preferably modulated according to a PWM scheme. The pulse width modulation may be performed by any known method as known in the art, e.g. by comparing a modulation signal with a triangular or saw tooth carrier signal. Continuingly, the modulated signal is supplied 105 to each set of windings within the motor; where the modulated signals supplied, to each set of windings, are shifted 107 with a time offset relative each other, where the time offset is based on the period of the predefined or measured period of the resonance frequency.

The invention has now been described with reference to specific embodiments. However, several variations of the electrical motor control system are feasible. For example, the control method may be applied on single phase or multi phase electrical motors, several possible configurations of the windings are possible, as already exemplified. Further, the controller may be configured to modulate the signal in numerous ways and with interchangeable components providing the same functionality. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for controlling an electrical motor system comprising a direct current (DC) source, a filter connected in parallel with the DC source and an electric motor with at least two sets of windings, said method comprising the steps of:
   providing a voltage signal from the DC source to an inverter circuit via conductors, said conductors having an inductance;
   modulating said voltage signal in the inverter circuit;
   supplying a time shifted modulated signal to each of said at least two sets of winding with a time offset between each set of windings respectively, wherein said time offset is based on a period of a resonance frequency, said resonance frequency being dependent on a capacitance of said filter and the inductance of said conductors.

2. The method according to claim 1, wherein the method further comprises a step of determining the resonance frequency by measuring the resonance frequency of the system.

3. The method according to claim 1 wherein the resonance frequency of the system is predetermined.

4. The method according to claim 1, wherein the time offset is dependent on a ratio between the period of the resonance frequency and the number of sets of windings comprised by the electric motor.

5. The method according to claim 1, wherein the step of modulating said voltage signal in the inverter circuit, comprises operating a plurality of switches comprised by the inverter circuit at a switching frequency.

6. The method according to claim 5, wherein said switching frequency is different than said resonance frequency.

7. The method according to claim 1, wherein said modulation is performed using time shifted carrier signals in order to generate multiple time shifted modulated signals.

8. The method according to claim 1, wherein said modulation is performed using one single carrier signal to generate one modulated signal, which modulated signal is time shifted to generate multiple time shifted modulated signals.

9. An electrical motor system comprising:
   a DC source;
   an electric motor comprising at least two sets of windings;
   a filter connected by conductors in parallel with the DC source, said conductors having an inductance;
   an inverter circuit connected between the filter and the electric motor, said inverter circuit comprising a plurality of switches;
   a controller configured for generating control signals for the plurality of switches so to supply a modulated signal to each set of windings, wherein each modulated signal is shifted with a time offset between each set of windings respectively, wherein said time offset is dependent on a period of a resonance frequency, said resonance frequency being dependent on a filter capacitance and the conductor inductance.

10. The system according to claim 9, wherein the DC source comprises a battery.

11. The system according claim 9, wherein the DC voltage source comprises an alternating current (AC) source and a rectifier circuit.

* * * * *